(12) United States Patent
Schautt (10) Patent No.: US 11,193,799 B2
(45) Date of Patent: Dec. 7, 2021

(54) ROTARY ENCODER FOR DETERMINING THE ANGULAR POSITION BETWEEN TWO ROTATING COMPONENTS

(71) Applicant: ABB GOMTEC GMBH, Seefeld (DE)

(72) Inventor: Martin Schautt, Munich (DE)

(73) Assignee: ABB Schweiz AG, Bruggerste (CH)

( * ) Notice: Subject to any disclaimer, the term of this patent is extended or adjusted under 35 U.S.C. 154(b) by 969 days.

(21) Appl. No.: 15/121,919

(22) PCT Filed: Feb. 26, 2015

(86) PCT No.: PCT/EP2015/000439
§ 371 (c)(1),
(2) Date: Jul. 18, 2018

(87) PCT Pub. No.: WO2015/128087
PCT Pub. Date: Sep. 3, 2015

(65) Prior Publication Data
US 2018/0328763 A1     Nov. 15, 2018

(30) Foreign Application Priority Data
Feb. 28, 2014 (DE) .......... 102014002670.1

(51) Int. Cl.
*G01D 5/347* (2006.01)
*G01D 5/36* (2006.01)

(52) U.S. Cl.
CPC ....... *G01D 5/3473* (2013.01); *G01D 5/34776* (2013.01); *G01D 5/36* (2013.01)

(58) Field of Classification Search
CPC .... G01D 5/3473; G01D 5/36; G01D 5/34776; G01D 5/244; G01D 5/2515; G01D 5/2525; G01D 5/142; G01D 5/145; G01D 5/147; G01B 7/004; G01B 7/00; G01B 7/046; G01B 7/10

See application file for complete search history.

(56) References Cited

U.S. PATENT DOCUMENTS

| | | | | |
|---|---|---|---|---|
| 4,606,695 A | * | 8/1986 | Lenz ................ | B25J 9/046 414/735 |
| 5,066,857 A | * | 11/1991 | Ernst ............... | G01D 5/36 250/231.15 |

(Continued)

FOREIGN PATENT DOCUMENTS

| EP | 0201106 | 11/1986 |
|---|---|---|
| EP | 0413180 | 2/1991 |

OTHER PUBLICATIONS

International Search Report in PCT Application PCT/EP2015/000439, EPO, dated Jul. 3, 2015.

(Continued)

*Primary Examiner* — Jennifer D Bennett
(74) *Attorney, Agent, or Firm* — Bourque & Associates (57) ABSTRACT

A rotary encoder for detecting the angle of rotation of a first rotatable shaft, with a first mark which is coupled with the first shaft, a second mark which is coupled with the second rotatable shaft, a third mark which is coupled with the second shaft, a fixed fourth mark and means for detecting a passage of the third mark though a vicinity of the fourth mark and means for detecting a coincidence of the angles of rotation of the first and the second marks.

15 Claims, 6 Drawing Sheets

(56) References Cited

U.S. PATENT DOCUMENTS 8,955,394 B2 * 2/2015 Voss ................. G01D 5/147
                                                              73/862.191
2013/0259724 A1 * 10/2013 Steinbauer ............. F01C 1/22
                                                              418/2

OTHER PUBLICATIONS

Written Opinion and Notice of Patentability in PCT Application PCT/EP2015/000439, EPO, dated Jul. 3, 2015.

* cited by examiner

ROTARY ENCODER FOR DETERMINING THE ANGULAR POSITION BETWEEN TWO ROTATING COMPONENTS

FIELD OF THE INVENTION

The invention lies within the field of rotary encoders. Rotary encoders are very widely used in drive technology in order to determine exactly the angular position of a rotating component, e.g. a drive shaft or driven shaft.

BACKGROUND OF THE INVENTION

A distinction is generally made between two types of rotary encoder. Absolute encoders supply an output signal which is directly representative of the angular position of a monitored component, i.e. of the orientation of the component relative to a reference position. Incremental encoders are simple and economical and, at the same size, achieve a significantly better resolution than absolute encoders, but only respond to movement. Therefore, they are readily suitable for measuring a change in angle of a rotatable component; however, in order to detect an angular position the component must first be oriented in the reference position and then the change in angle from the reference direction to said angular position must be registered.

Moving to the reference position is particularly time-consuming if, as shown for example in the patent application U.S. Pat. No. 6,791,219, the monitored component is driven via a reduction gear. It is not sufficient for the input shaft of the reduction gear to move to a reference position since, if the gear ratio is i, this reference position can correspond to i different positions of the monitored component. In order to bring the monitored component itself into a reference position, up to i rotations of the input shaft can be necessary.

Document EP 0 413 180 A1 discloses a rotary encoder comprising two rotatable discs connected by a gear. The first disc has a mark rotating with it, the second a spiral reference sensing field. A reference signal is generated after each complete turn of the first disc. Further, when the two discs rotate, they can reach a position in which the mark crosses the reference sensing field. This instant is sensed, and a further reference signal is generated. Based on the two reference signals, an absolute angular position of the first disc can be found.

Document EP 0 201 106 A1 discloses a rotary encoder comprising two shafts connected by a gear, each of which shafts carries a co-rotating mark. In a unique initial position of the two shafts, a coincident index signal is generated by the two marks triggering simultaneously. Due to the gear ratio, this initial position is reached again after 16 complete rotations of the input shaft. Other coincidences of the rotating angles of the two shafts occurring during these 16 rotations cannot be detected.

It can be regarded as the object of the invention to provide a rotary encoder of simple structure which is in particular suitable for the detection of an angular position of a component driven via a reduction gear and which only requires a slight rotation of the input shaft of the reduction gear in order to be able to state the angular position of the component in absolute terms. Further, the rotary encoder shall allow the use of point-shaped sensors for providing the signals needed for determining the angular position.

SUMMARY OF THE INVENTION

This problem is solved though a rotary encoder for detecting the angular position of a first shaft, with a first mark which is rotatable with the first shaft, with a second shaft which rotates in a fixed ratio to the first shaft, a second mark which is rotatable with the second shaft, with means for detecting the angular position of the second shaft and means for detecting a coincidence of the angles of rotation of the first and the second marks, wherein one of said first and second marks is a sensor and the other is adapted to be detected by said sensor.

If the first shaft is arranged at the output and the second shaft is arranged at the input of a reduction gear, then in each rotation of the first shaft there are several coincidences of the first mark and the second mark, and each possible angular position of the first shaft is unequivocally identified though its angular distance from a coincidence of the first and second marks and though the angular distance from a configuration of the reduction gear in which the second shaft is located in a known angular position. It is therefore sufficient, starting out from an unknown angular position of the first shaft, to rotate the shafts until both coincidence and the angular position of the second shaft have been detected in order to be able then to state the angular position of the first shaft.

The means for detecting the angular position of the second shaft can comprise an absolute encoder which can directly determine the angular position. Such an absolute encoder could for example be designed as a Hall effect sensor with rotating magnetic tablet, which sensor determines the angular position of the shaft from the orientation of the magnetic field created between the magnetic tablet and the Hall effect sensor. It is thus not necessary to rotate the shaft in order to determine the angular position. The resolution of absolute encoders is frequently too low for them to be used directly on the first shaft in order to detect its angular position, and if an absolute encoder is used on its own on the input shaft of a reduction gear with the reduction ratio i, then there are i angular positions of the output shaft which correspond to an identical angular position of the input shaft and cannot be distinguished from one another. However, the combination with the means for detecting the coincidence of angle of rotation makes it possible to resolve this ambiguity and to determine the angular position of the output shaft with an accuracy greater by a factor of i than would be possible with an absolute encoder arranged directly on the output shaft.

However, it is sufficient if the angular position of the second shaft can be determined within a value range of 0 to 360°. Therefore, according to an economical and simply implementable alternative the means for detecting the angular position of the second shaft comprise a third mark rotatable with the second shaft, a fixed fourth mark and means for detecting a passage of the third mark though a vicinity of the fourth mark.

The marks which are rotatable together with their associated shaft can be mounted directly on this shaft; however, a coupling to the shaft via any kind of auxiliary gear would also be conceivable.

If the second and third marks are coupled with the same shaft, they can be identical.

The, where provided, generally fixed fourth mark will typically be a sensor which is suitable for detecting the passage of the third mark through its vicinity.

Advantageously, the mark designed as a sensor is a magnetic field sensor and the mark which is to be detected is a magnet.

If, of the third mark and the fourth mark, one is a sensor and the other can be detected by the sensor, then the output of the sensor should be a periodic function of the angle of rotation of the second shaft, whereby a base period of the function should correspond to a rotation of the second shaft. This ensures that the passage of the third mark is clearly recognisable in the signal, even if the signal contains additional information or is affected by noise, or that, if further marks are present, their passage though the vicinity of the fourth mark can be clearly distinguished from a passage of the third mark.

The gear, already mentioned above, coupling together the first and second shafts can itself be part of the rotary encoder.

Preferably, the gear is designed as a form-fitting gear which makes possible a slip-free transmission between the first and second shafts.

Preferably, the gear is designed as a reduction gear, so that the output shaft of the gear rotates more slowly than the input shaft of the gear, according to the gear ratio.

The gear can be of any construction type. For example, gears with an axially symmetrical structure or ring gears are preferred for installation in a robot arm. Such gears, for example planetary gears or ellipto-centric or Harmonic Drive® gears, have as one gear element an arrangement of inner gear teeth which meshes with the gear teeth of a further gear element. The ring gear can be firmly connected to a housing of the gear; this permits, in particular, a space-saving installation in a robot arm.

The planetary or harmonic drive gear preferably functions in two-shaft mode, whereby two of its shafts function as the first and second shafts of the rotary encoder and the third shaft is fixed.

Advantageously, the first and second shafts are arranged coaxially. In this case, end faces of the two shafts can be arranged opposite one another, whereby the first mark can be arranged on one end face and the second mark can be arranged on the other end face. In this way, an arrangement is achieved which is particularly optimised in terms of the construction space required. A complex fastening construction can therefore be dispensed with.

The transmission ratio of the gear, i.e. the number of rotations of the second shaft necessary for a rotation of the first shaft, is designated with i, whereby a positive value of i stands for a rotation of the two shafts in the same direction, a negative value for a rotation in opposite directions.

If, as already mentioned, of the first mark and the second mark, one is a sensor and the other can be detected by the sensor, then the output of the sensor should be a periodic function of the angle of rotation of the first shaft, whereby, in order to allow a coincidence to be unequivocally recognised, |i−1| base periods of this function should correspond to a rotation of the first shaft.

The rotary encoder also advantageously contains an evaluation unit for the reception of a coincidence signal from the means for detecting a coincidence of the angle of rotation and of a passage signal from the means for detecting a passage and for determining an angle position on the basis of an angle of rotation covered between reception of the coincidence signal and of the passage signal.

In order to determine a relative angle of rotation of the second shaft, the rotary encoder includes a corresponding sensor. The relative angle of rotation can be detected indirectly, on the first shaft, or preferably directly on the second shaft. An incremental encoder can for example be used as a sensor. In a particularly advantageous embodiment of the invention, where the means for detecting the angular position of the second shaft comprise an absolute encoder, this encoder is also used to determine the relative angle of rotation.

The rotary encoder according to the invention is preferably used in a robot. The robot can comprise at least two arm sections which can be swiveled relative to one another, one of which is connected in a rotationally fixed manner to the first shaft and the other being connected in a rotationally fixed manner to the housing of the gear, so that the position of the robot can be determined exactly by means of the rotary encoder.

BRIEF DESCRIPTION OF THE DRAWINGS

Further features and advantages of the invention are explained in the following description of exemplary embodiments with reference to the enclosed figures, in which.

DESCRIPTION OF THE PREFERRED EMBODIMENTS

Figure 1:
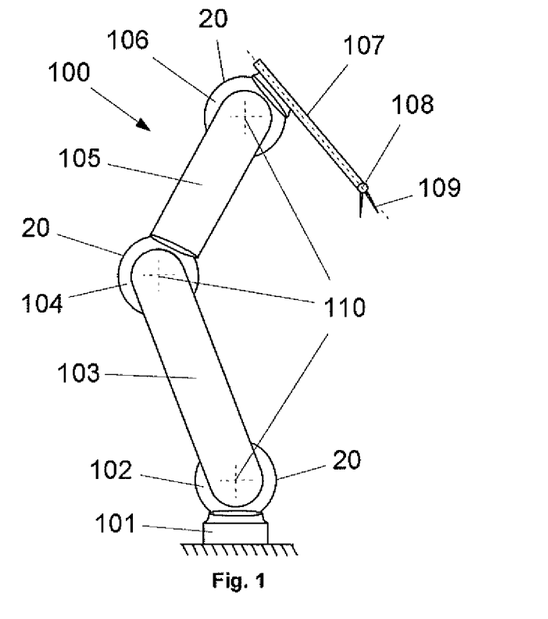
FIG. 1 shows a robot.

FIG. 1 shows a robot 100. The robot 100 comprises several arm sections connected swivelably with one another, in this case a base 101, a lower arm 103, an upper arm 105, an instrument 107 and three elbow pieces 102, 104, 106. Each elbow piece 102, 104, 106 is connected, so as to swivel around two axes 110 arranged at right angles to one another, with two adjacent arm sections 101 and 103, 103 and 105 or 105 and 107. The instrument 107 can in turn comprise an elbow piece 108 which connects a shaft and an end effector 109 of the instrument 107 in an articulated manner. In the configuration of the robot shown, three of the axes 110 are perpendicular to the drawing plane, further axes run in particular in the longitudinal direction of the arm sections 101, 103, 105.

Figure 2:
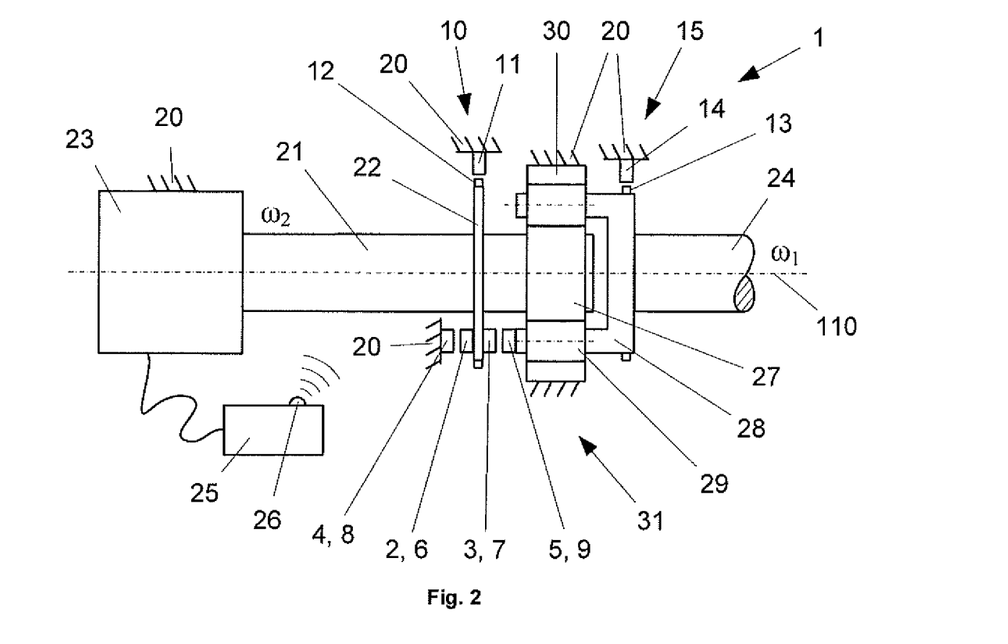
FIG. 2 shows a schematic structure of a rotary encoder.

FIG. 2 shows a rotary encoder 1 and its surroundings in schematic form. Such a rotary encoder 1 can be provided on each individual axis 110 of the robot 100. In the following, by way of example, the case is considered that the rotary encoder 1 is arranged between the base 101 and the lower elbow piece 102 in order to monitor the azimuthal orientation of the lower arm 103.

A motor 23 is firmly connected to a housing 20 of the elbow piece 102 in order to drive an input shaft 21 of the rotary encoder 1. A circular disc 22 is attached to the input shaft 21. The disc 22 carries two marks 2, 3, in this case in the form of two magnets 6, 7 or in the form of a single magnet, the magnetic field of which extends on two sides of the disc 22. A further mark 4 is formed by a sensor 8, for example a Hall effect sensor, which is mounted on the housing 20 in a fixed position in order to detect the passage of the magnet 6 once during the course of each rotation of the input shaft 21.

An incremental encoder 10 comprises a sensor 11 fixed to the housing and a plurality of marks 12 which can be detected by the sensor 11, distributed evenly around the periphery of the disc 22.

As soon as the sensor 8 detects a passage of the magnet 6, the angular position of the input shaft 21 is known, and its further rotation can be tracked quantitatively on the basis of the pulses supplied by the incremental encoder 10. For the same purpose, the sensor 8 and the incremental encoder 10 can also be replaced by a single absolute encoder. If the output signal of the latter assumes a predetermined value, for example passes though zero, this can be equated with the detection of the passage; the further rotation of the shaft 21 can be monitored on the basis of the further development of the output signal.

A sun wheel 27 of a planetary gear 10 is located on an overhung end of the input shaft 21. A ring gear 30 of the planetary gear 10 is firmly connected to the housing 20. Planetary wheels 29 held by a support 28 mesh with the sun wheel 27 and the ring gear 30. The support 28 is firmly connected to an output shaft 24. i rotations of the input shaft 21 drive one rotation of the output shaft 24.

The support 28 has several journals, on each of which one of the planetary wheels 29 is mounted. One of these journals carries on its tip facing the disc 22 a mark 5 in the form of a further sensor 9, which is configured to detect the magnet 7 when this is positioned opposite it at a short distance.

Marks 13 on the support 28, distributed evenly around the periphery, together with a sensor 14 fixed to the housing, form a further incremental encoder 15.

The outputs from the sensors 8, 9, 11, 14 are received by an evaluation unit 25. While the evaluation unit 25 can be permanently wired to the sensors 8, 11, 14 fixed to the housing 20, a slip ring or a wireless interface 26, for example an RFID interface, can be provided for the communication with the sensor 9. The RFID interface makes it possible not only to transmit an output from the sensor 9 to the evaluation unit 25 but also to supply operating energy to the sensor 9.

In the present case the evaluation unit 25 is also connected to the motor 23 and controls its rotation. Since the evaluation unit 25 thus "knows" the direction of rotation of the motor 23, it can determine an angle of rotation passed through since an arbitrarily defined starting point in time in that it counts the signal pulses supplied by one of the sensors 11, 14 since this starting point, upwards or downwards depending on the direction of rotation. In this case one of the two incremental encoders 15, 10 is redundant and can be dispensed with without this affecting the function of the robot 100.

Figure 3:
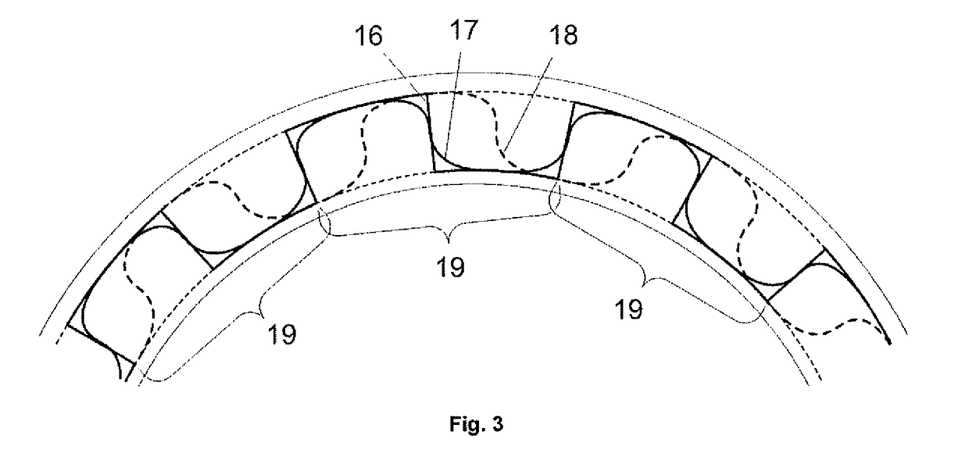
FIG. 3 shows, in partial representation, conducting paths of a resolver.

According to an advantageous embodiment of the invention, the incremental encoder 15 and/or 10 is replaced with a resolver. Such a resolver is indicated schematically in FIG. 3; it comprises a conducting path 16 which is rotatable with the shaft which is to be monitored, for example on the disc 22, and oscillates about a circular path coaxial with the shaft 21 with a whole number n of periods, and two fixed conducting paths 17, 18 which oscillate with the same number n of periods as the conducting path 16, but phase-shifted by a quarter period relative to one another. An alternating current on the conducting path 16 induces an alternating voltage in the conducting paths 17, 18, the amplitude of which depends on the phase shift between the conducting paths 16, 17 and 18. Each individual period 19 of the conducting path 16 can in this case be equated with one of the aforementioned marks 13 or 12 which, if it lies exactly in phase with one of the conducting paths 17, 18 functioning as sensors 11 or 14, induces in this a maximum voltage. With each 360° rotation of the conducting path 16, such a phase coincidence occurs n-times, so that, as with a conventional incremental encoder, n pulses can be derived per rotation. However, since the induced amplitudes are continuously changeable with the angular position, the angular position can also be estimated in quantitative terms between two phase coincidence positions.

Figure 4:
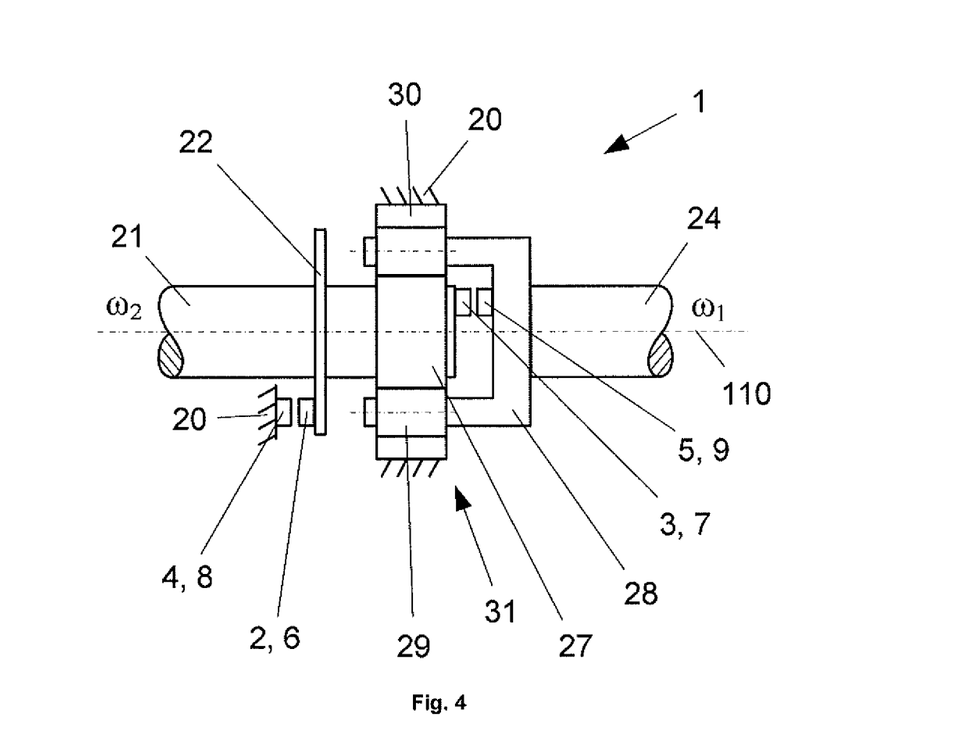
FIG. 4 shows a schematic structure of a rotary encoder in an alternative embodiment.

FIG. 4 shows a schematic representation of a rotary encoder 1 with an alternative arrangement of first and second marks 3, 5. This variant is particularly suitable if the first and second shafts 21, 24 are so arranged that their end faces are opposite one another. In this case the mark 5 can be mounted on the end face of the first shaft 24 and the mark 3 can be mounted on the end face of the second shaft 21, which allows a more compact design to be achieved. Which of the marks 3, 5 is in this case the sensor and which is detected by the sensor is immaterial. The rest of the structure can be designed analogously to FIG. 2.

Figure 5:
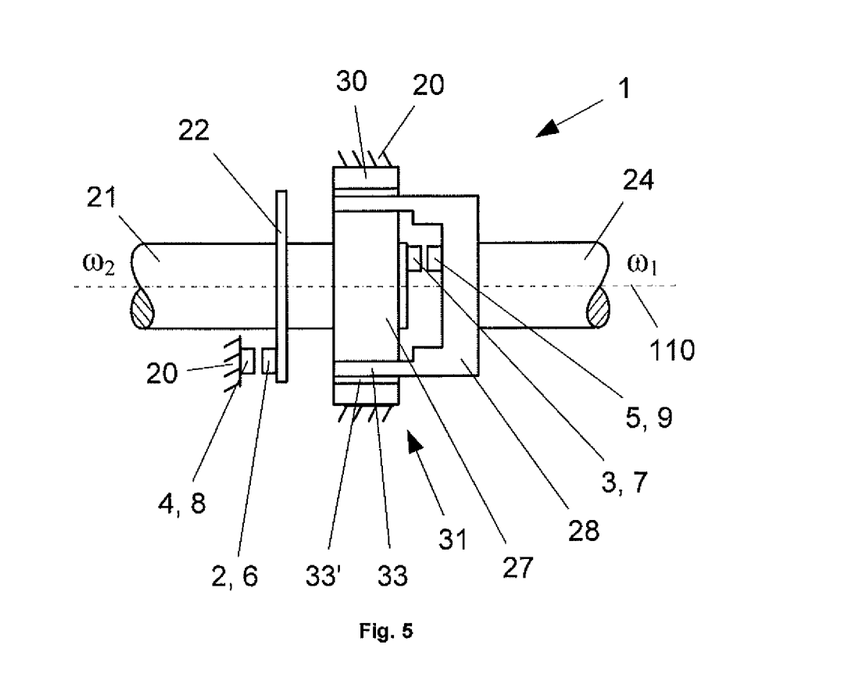
FIG. 5 shows a schematic structure of a rotary encoder with a Harmonic Drive® gear.

FIG. 5 shows an advantageous embodiment of the rotary encoder 1 shown in FIG. 4 in which the planetary gear has been replaced with a Harmonic Drive® gear. At the end of the second shaft 21 there is a "wave generator" 32, which drives a so-called "flexspline" 33. An outer gearing 33' of the "flexspline" 33 meshes with the inner gearing of a ring gear 30. A support 28 establishes a rotationally fixed connection between the "flexspline" 33 and the first shaft 24. Analogously to FIG. 4, the sensor 7 can again be arranged on the end face of the first shaft 24 and the magnet 6 can be arranged on the end face of the second shaft 21 or on the support 28 (or vice versa).

Figure 6:
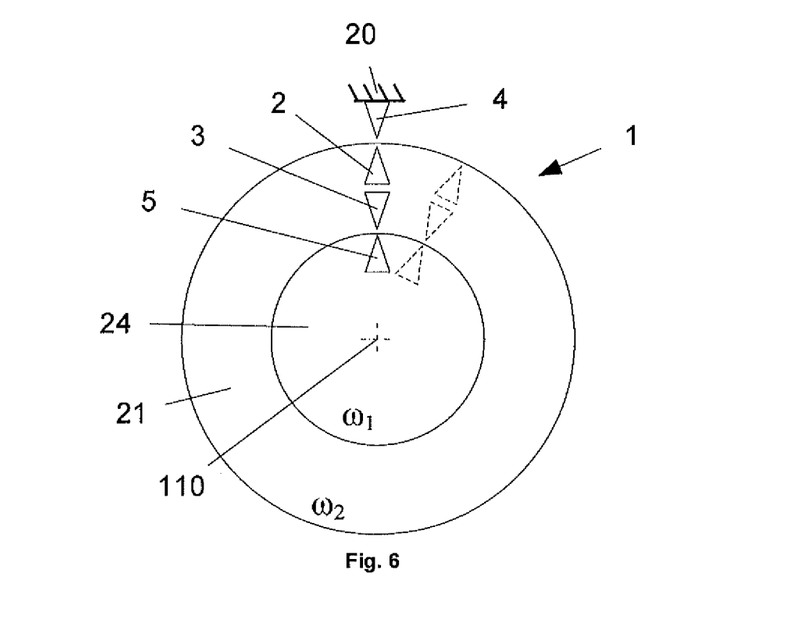
FIG. 6 shows a sketch illustrating the principle of the rotary encoder.

FIG. 6 shows the rotary encoder 1 in a schematic diagram in order to explain in greater detail the functional principle involved in the detection of a passage as well as a coincidence of the angle of rotation. The figure shows an axial view of the coaxially arranged first and second shafts 21, 24. The two shafts 21, 24 each assume an angular position in which the marks 2 and 4 coincide and at the same time the marks 3 and 5 coincide (see marks drawn in solid lines), i.e. a passage and a coincidence of angle of rotation occur simultaneously. This position defines a reference position of the first shaft 24; an angle of rotation $\omega_1$ of the first shaft 24 can be stated as a deviation from this reference position. In the same way, an angle of rotation $\omega_2$ of the second shaft 21 can be stated as a deviation from the reference position.

The choice of the position shown as a reference position is purely arbitrary and is made for the purpose of ease of recognition; in principle, any other angular position of the shafts 21, 24 can also be defined as reference position.

If the second shaft 21 rotates around the axis of rotation 110, then the first shaft 24 rotates with it according to the gear ratio i. Depending on the construction type of the gear 10, the first shaft 24 can rotate in the same direction as the shaft 21 (i.e. i is positive) or in the opposite direction (i.e. i is negative). If both shafts rotate in the same direction, for example in the clockwise direction, then the third mark 2 lines up again with the fourth mark 4 when the second shaft 21 has completed a full rotation. The passage of the third mark 2 though the vicinity of the fourth mark 4 is detected though suitable means, for example the fourth mark 4 is designed in the form of a sensor 8, and a passage signal $S_D$ is transmitted to the evaluation unit 25. On each further full rotation, a passage signal $S_D$ is again detected.

Following a full rotation of the second shaft 21, the first mark 5 located on the first shaft 24 has rotated further, according to $\omega_2 = i \cdot \omega_1$, by the i-th part of a full rotation. Consequently, the next coincidence signal $S_K$ is detected when the second mark 3 located on the second shaft 21 catches up with the first mark 5 located on the first shaft 24 (see marks drawn in broken lines in FIG. 6). The coincidence of the marks 3, 5 is detected through suitable means, for example the first mark 5 designed in the form of a sensor 9, and a coincidence signal $S_K$ is transmitted to the evaluation unit 25. This principle continues accordingly with further rotation of the two shafts until a reference position of the first shaft 24 is reached again.

If both shafts 21, 24 rotate in opposite directions, for example the first shaft 24 rotates in a clockwise direction and the second shaft 21 rotates in an anticlockwise direction, then starting out from the reference position a coincidence of the angle of rotation occurs first (marks drawn in broken lines) before the third mark 2 lines up with the fourth mark 4.

Ideally, the signals $S_K$, $S_D$ are pulse-formed, i.e. the angular range within which they indicate a passage or a coincidence through deviation from a quiescent value is so small that it can be regarded as point-formed. In practice, this is often not the case; instead, the angular ranges within which they deviate from the quiescent value can be several times greater than the angular distances between the marks 12 or 13, so that several pulses can come from the sensors 11 or 14 of the incremental encoder 11 or 15 during a passage or a coincidence.

Figure 7:
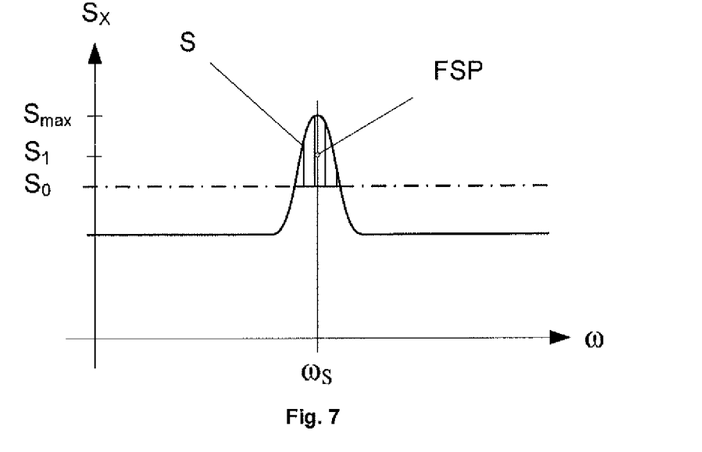
FIG. 7 shows a diagram for determining the angle of rotation from a signal.

FIG. 7 shows by way of example such a curve of the signal $S_K$ as a function of the angle of rotation $\omega$ of the shaft 21 or 24, whereby the pulses of the incremental encoder 11 or 15 are symbolised though narrow vertical lines on each side of a maximum $S_K$ at $\omega_s$.

In the simplest case, the evaluation unit 25 defines this angle of the signal maximum as the angle of coincidence.

Alternatively, the evaluation unit 25 can determine the centroid of the area which lies below the curve $S_K$ and above a straight line $S_0$ which can be defined arbitrarily. In this case the angle $\omega_s$ is unambiguously derived from the angular value of the centroid; this can be calculated generally as $$\omega_S = \frac{\int S_K(\omega)\omega d\omega}{\int S_K(\omega) d\omega} \quad \omega_S = \frac{\int S_K(\omega)\omega d\omega}{\int S_K(\omega) d\omega},$$

whereby the integrals in each case run from one point of intersection of the curve $S_K$ with the straight line $S_0$ to the other. Thus, an angle $\omega_s$ can be determined unambiguously for each coincidence signal $S_K$ and for each passage signal $S_D$.

Figure 8:
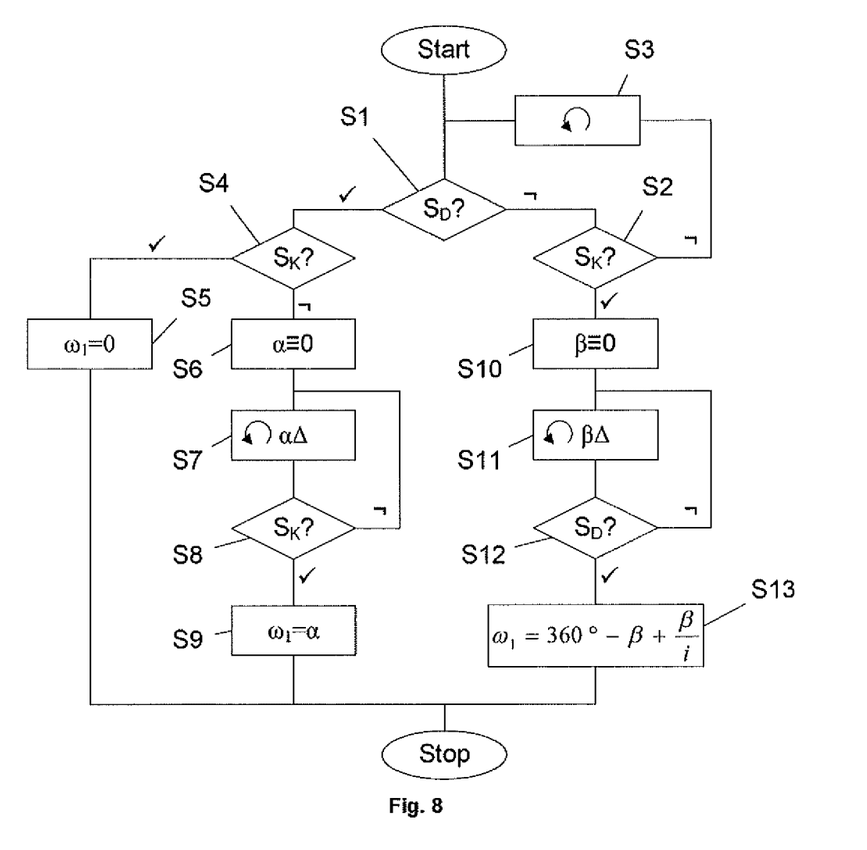
FIG. 8 shows a flow chart of an operating method of the rotary encoder.
Figure 9:
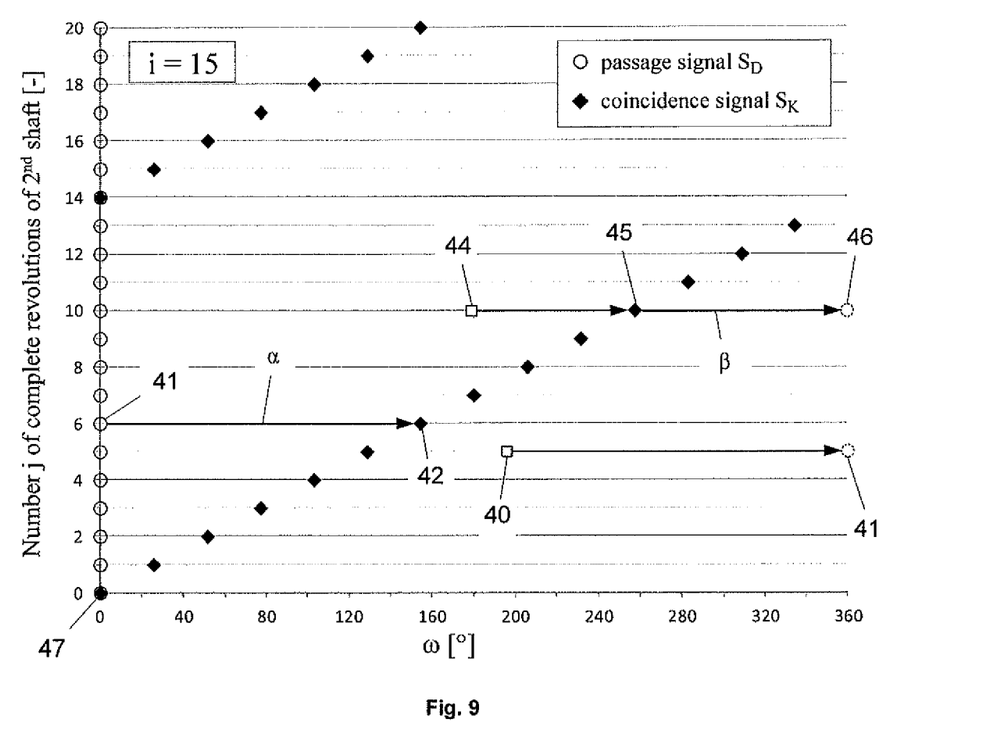
FIG. 9 shows a diagram with coincidence signals and passage signals, entered over the angle of rotation of an input shaft, for a gear with identical direction of rotation of input and output shafts.

The following part of the description now explains the method for determining the angular position of the first shaft 24 in relation to the reference position. The individual steps of the method are shown in FIG. 8. FIG. 9 shows a diagram in which the passages and coincidences of angle of rotation derived from the angle of rotation $\omega$ are represented for a rotary encoder with a gear ratio, selected by way of example, of i=15. Starting out from the reference position 47, the number j of full rotations of the second shaft 21 are entered on the ordinates of the diagram. The angular range $\omega$ of a full rotation is entered on the abscissa and ranges from 0° to 360°. For the reference position, j=0, $\omega$=0. If, starting out from the reference position 47, the second shaft 21 has completed a full rotation, at j=1, $\omega$=0, a passage signal is detected again. The shafts rotate further, whereby the second shaft 21 now catches up with the first shaft 24 and a coincidence of angle of rotation occurs at j=1, $\omega$=360°/(i−1)=approx. 25.7°. Passage signals always occur at $\omega$=0; further coincidences of angle of rotation occur at j=n, $\omega$=n*360°/(i−1).

The method is carried out by the evaluation unit 25. At the beginning of the method, the angular position $\omega_1$ of the first shaft 24 is unknown, it can for example correspond to the point 40 or 44 in FIG. 9; the angular position $\omega_2$ of the second shaft 21 is also unknown. The method starts with step S1. In step S1 it is checked whether a passage signal $S_D$ is present. If no passage signal $S_D$ is present, in step S2 it is checked whether a coincidence signal $S_K$ is present. If no coincidence signal $S_K$ is present either, the first shaft 24 is rotated (step S3), and the queries in steps S1 and S2 are repeated until a passage signal $S_D$ (step S1) or a coincidence signal $S_K$ (step S2) is received.

If a passage signal Sp is received in step S1, in step S4 it is checked whether a coincidence signal $S_K$ is simultaneously present.

If this is the case, then the angular position $\omega_1$ of the first mark 5 on the first shaft 24 coincides with the fourth mark 4. The first shaft 24 is thus in its reference position 47. The evaluation unit 25 therefore determines, in step S5, the angle of rotation of the first shaft 24 as zero ($\omega_1$=0), and the method ends.

If a passage signal $S_D$, 41, was received in step S1 but no simultaneous coincidence signal $S_K$ was received in step S4, then in step S6 a counter is initialised. The evaluation unit 25 thereupon measures the angle of rotation of the rotating second shaft 21 (step S7) by incrementing the counter each time a pulse from the incremental encoder 10 is received. The evaluation unit ends the measurement as soon as a coincidence signal $S_K$, 42 is received (step 8). The value $\alpha$ of the counter then corresponds to the angle of rotation which the second shaft 21 has covered, starting out from the reception of the passage signal $S_D$, 41, up until reception of the coincidence signal $S_K$, 42.

Based on this counter value $\alpha$, the evaluation unit 25 now determines the angle of rotation $\omega_1$ of the first shaft 24 (step S9). Surprisingly, this is equal to the counter value, i.e. $\omega_1 = \alpha$. The method then ends.

If, in step S1, no passage signal $S_D$ is initially received, but a coincidence signal $S_K$, 45 is received in step S2, then the evaluation unit 25 also initiates the counter in step S10. The evaluation unit 25 picks up the pulses transmitted by the incremental encoder 10 while the second shaft 21 rotates (step S11), and increments the counter on each reception of a pulse. The evaluation unit 25 interrupts the measurement as soon as a passage signal $S_D$, 46 is received (step 12). The counter value $\beta$ of the counter reached at this point states the angle of rotation which the second shaft 21 has covered, starting out from the reception of the coincidence signal $S_K$, 45 up until reception of the passage signal $S_D$, 46.

Based on this counter value $\beta$, the evaluation unit 25 now determines the angle of rotation $\omega_1$ of the first shaft 24 (step S13). To do so, the evaluation unit 25 first determines the angle of rotation which the first shaft 24 has assumed at the moment of coincidence of angle of rotation $S_K$, 45. This angle of rotation is 360° minus the counter value $\beta$.

However, starting out from the position of the coincidence of angle of rotation $S_K$, 45, the second shaft 21 was rotated further by the angle $\beta$. Since the transmission ratio of the gear is i, consequently the first shaft 24 is rotated further from the coincidence of angle of rotation by β/i. Expressed mathematically, the angle of rotation is thus:

$$\omega_1 = 360° - \beta + \frac{\beta}{i} \omega_1 = 360° - \beta + \frac{\beta}{i}.$$

The method then ends.

Once the angle of rotation $\omega_1$ of the first shaft has been determined once using the above method, it can be kept continuously updated on the basis of the pulses from the incremental encoder 15, 10.

The evaluation unit 25 can also determine the angle which the second shaft 21 has covered, measured from the last reference position 47 of the first shaft 24, since the relationship $\omega_2 = i \cdot \omega_1$ remains unchanged.

Figure 10:
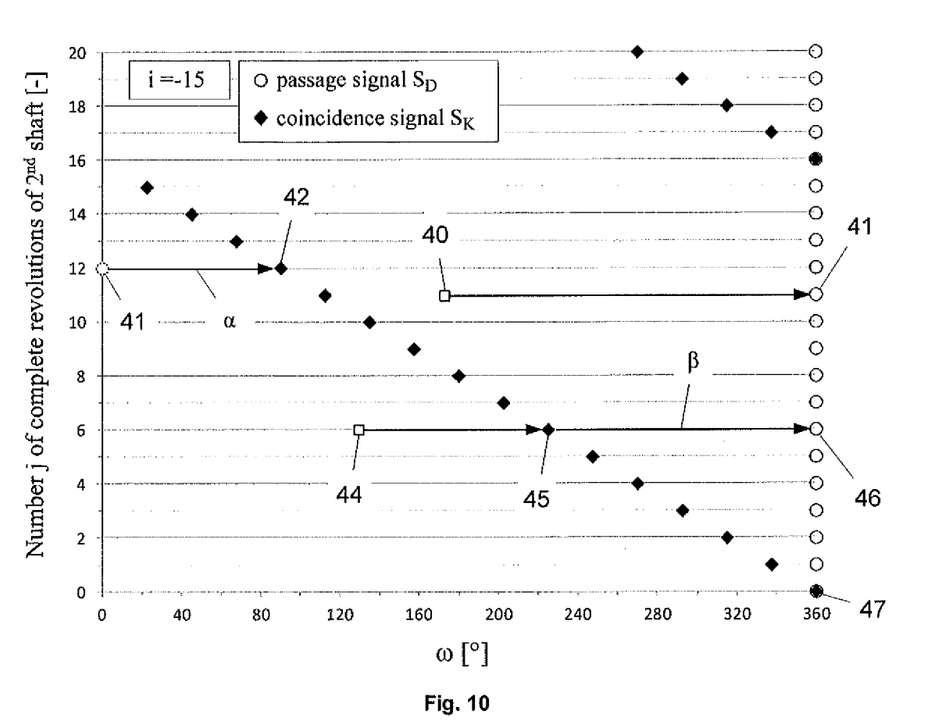
FIG. 10 shows a diagram with coincidence signals and passage signals, entered over the angle of rotation of an input shaft, for a gear with contrary direction of rotation of input and output shafts.

The method can be carried out with gears 10 with shafts 21, 24 rotating in the same direction (see FIG. 9) and with shafts 21, 24 rotating in opposite directions (see FIG. 10). The method explained above related to a gear with shafts rotating in the same direction (i=15). Since the method can be applied analogously to rotary encoders with shafts rotating in opposite directions, in this case reference is only made to FIG. 10, which shows the correspondingly valid signals with a gear ratio of i=−15.

Modifications and substitutions by one of ordinary skill in the art are considered to be within the scope of the present invention, which is not to be limited except by the allowed claims and their legal equivalents.

REFERENCE NUMBERS 1 rotary encoder
2 mark
3 mark
4 mark
5 mark
6 magnet
7 magnet
8 sensor
9 sensor
10 incremental encoder
11 sensor
12 mark
13 mark
14 sensor
15 incremental encoder
16 conducting path
17 conducting path
18 conducting path
19 period
20 housing
21 shaft
22 disc
23 motor
24 shaft
25 evaluation unit
26 receiver
27 sun wheel
28 support
29 planetary wheel
30 ring gear
31 gear
32 wave generator
33 flexspline
40 unknown angular position
41 passage signal
42 coincidence signal
44 unknown angular position
45 coincidence signal
46 passage signal
47 reference position
100 robot
101 base
102 elbow piece
103 lower arm
104 elbow piece
105 upper arm
106 elbow piece
107 instrument
108 elbow piece
109 end effector
110 axis

The invention claimed is:

1. A rotary encoder (1) for detecting the angular position of a first shaft (24), with a first mark (5) which is rotatable with the first shaft (24), in relation to a second shaft (21) rotating in a fixed ratio to the first shaft (24), said second shaft (21) including a second mark (3) which is rotatable with the second shaft (21), said rotary encoder comprising:
an angular position detector, configured for detecting the angular position of the second shaft (21) and a coincidence of angle of rotation detector, configured for detecting a coincidence of the angle of rotation of the first mark (5) in relation to the second mark (3), wherein said coincidence of angle of rotation detector includes a sensor, wherein one of the first mark (5) and the second mark (3) is said sensor, and wherein said sensor is configured for detecting a presence and/or proximity of the other of said first mark (5) or second mark (3) in relation to said sensor.

2. The rotary encoder according to claim 1, characterised in that the angular position detector for detecting the angular position of the second shaft (21) comprises a third mark (2) which is rotatable with the second shaft (21) and a fixed position fourth mark (4), and wherein the rotary encoder further includes an evaluator (25), responsive to at least said fixed position fourth mark (4), and configured for detecting a passage of the third mark (2) through a vicinity of the fourth mark (4).

3. The rotary encoder according to claim 2, characterised in that the fixed position fourth mark (4) is a sensor (8) and the third mark (2) is configured to be detected by the sensor (8), and wherein the output from the sensor (8) is a periodic function of an angle of rotation of the second shaft (21), and wherein a base period of the periodic function corresponds to one rotation of the second shaft (21).

4. The rotary encoder according to claim 1, characterised in that the angular position detector for detecting the angular position of the second shaft (21) comprises an absolute encoder.

5. The rotary encoder according to claim 1, characterised in that the first and second shafts (24, 21) are rotatably coupled by means of a gear (31).

6. The rotary encoder according to claim 5, characterised in that the gear (31) is a form-fitting gear.

7. The rotary encoder according to claim 5, characterised in that the gear (31) is a reduction gear.

8. The rotary encoder according to claim 5, characterised in that the gear (31) is a ring gear.

9. The rotary encoder according to claim 5, characterised in that the first and second shafts (24, 21) are coaxially aligned and have end faces, arranged opposite one another, on which the first mark and the second mark (5, 3) are arranged respectively.

10. The rotary encoder according to claim 3, characterised in that the output from the sensor (8) is the periodic function of the angle of rotation ($\omega_1$) of the second shaft (21), and wherein one rotation of the second shaft (21) corresponds to |i−1|base periods of the function.

11. The rotary encoder according to claim 1, further including an evaluator (25) configured for coincidence of angle of rotation detector, and for receiving a passage signal ($S_D$) from a passage detector, said passage detector configured for detecting a passage of the third mark (2) through a vicinity of the fourth mark (4), and wherein said evaluator (25) is configured for determining an angle position of said first shaft (24) and said second shaft (21) on the basis of an angle of rotation ($\alpha$, $\beta$) covered between reception of the coincidence signal ($S_K$) and reception of the passage signal ($S_D$).

12. The rotary encoder according to claim 1, further including a sensor (11, 14) for detecting a relative angle of rotation of the first and/or the second shaft (21, 24).

13. A robot (100) with a rotary encoder (1) according to claim 5, characterised in that the robot (100) comprises at least two arm sections (101-109) which can be swivelled relative to one another, one arm section of which is connected in a rotationally fixed manner to the first shaft (24) and the other arm section being connected in a rotationally fixed manner to a housing (20) of the gear (31).

14. The rotary encoder according to claim 1, characterised in that, one of the first mark and the second mark (5, 3) is a magnet (7) and the other one of the first mark and the second mark (3, 5) is said sensor, said sensor comprising a magnetic field sensor (9).

15. A method for detecting the angular position of a first shaft (24) which is coupled via a gear (31) to a second shaft (21), so that one rotation of the first shaft (24) corresponds to i rotations of the second shaft (21), said method comprising the steps of:

rotating the first and second shafts (21, 24);

detecting a passage of a third mark (2) rotating with the second shaft (21) through a reference position;

detecting a coincidence of angle of rotation between a second mark (3) rotating with the second shaft (21) and a first mark (5) rotating with the first shaft (24), wherein one of the first and second marks (5, 3) is a sensor configured for detecting a presence and/or proximity of the other of the first and second marks (5, 3) in relation to said sensor;

determining an angle of rotation ($\alpha$, $\beta$) covered between the passage though the reference position and the coincidence of angle of rotation; and determining the angular position on the basis of the angle of rotation ($\alpha$, $\beta$) covered.

* * * * *